United States Patent
Brummer et al.

[11] Patent Number: 6,115,583
[45] Date of Patent: Sep. 5, 2000

[54] DEVICE FOR THE CONTACTLESS TRANSMISSION OF DATA TO MOBILE DATA CARRIERS WITH SYSTEM FOR PREVENTING TOO CLOSE AN APPROACH

[75] Inventors: Wolfgang Brummer, Nürnberg; Gerd Elbinger, Fürth, both of Germany

[73] Assignee: Siemens Aktiengesellschaft, Munich, Germany

[21] Appl. No.: 09/035,009

[22] Filed: Mar. 5, 1998

Related U.S. Application Data

[63] Continuation of application No. PCT/DE96/01629, Sep. 2, 1996.

[30] Foreign Application Priority Data

Sep. 5, 1995 [DE] Germany ............ 295 14 235 U

[51] Int. Cl.[7] ...................................... H04M 1/00
[52] U.S. Cl. .............. 455/41; 455/129; 340/825.54
[58] Field of Search ........................... 455/557, 556, 455/558, 90, 575, 128, 129, 41; 340/825.54, 825.31, 825.34

[56] References Cited

U.S. PATENT DOCUMENTS

| 4,801,786 | 1/1989 | Stobbe ..................... 235/377 |
| 5,280,435 | 1/1994 | Weisshaupt et al. ......... 342/44 |
| 5,354,975 | 10/1994 | Ishibashi et al. ........... 235/380 |
| 5,426,667 | 6/1995 | Van Zon ................... 455/41 |
| 5,519,729 | 5/1996 | Jurisch et al. .............. 375/259 |

FOREIGN PATENT DOCUMENTS

| 0649110 | 4/1995 | European Pat. Off. . |
| 2679670 | 1/1993 | France . |
| 2702324 | 9/1994 | France . |
| 43 02 387 | 8/1993 | Germany . |
| 42 42 112 | 6/1994 | Germany . |
| 42 43 108 | 6/1994 | Germany . |
| 9501010 | 1/1995 | WIPO . |

*Primary Examiner*—Edward F. Urban
*Assistant Examiner*—Tilahum Gesesse
*Attorney, Agent, or Firm*—Sughrue, Mion, Zinn, Macpeak & Seas, PLLC

[57] ABSTRACT

A device for contactless transmission of at least data to mobile data carriers, in particular chip cards, via an electromagnetic field. The device includes an antenna (3) for emitting data to and/or receiving data from the mobile data carriers (15), an antenna field area (1) at least for covering the antenna (3), and spacers (5, 7). The antenna field area is bounded by edge regions and the spacers are located on at least one of the edge regions of the antenna field area (1). The spacers are configured to prevent areas of the human chest, back and pelvis from approaching too close to the antenna field area. They can be configured, e.g., as bows arranged at least on two opposite side edges (17, 19) of the antenna field area. Alternately, the device can be fashioned with a well (13) for holding the antenna field area or with at least one elevation (25, 27) on at least one edge region of the antenna field area in lieu of or in addition to the spacers. The invention thereby, for example, prevents an impermissibly close approach of sensitive body parts such as the chest, back and pelvis to the antenna field area, which might otherwise inappropriately affect electronic implants and the like.

26 Claims, 4 Drawing Sheets

DEVICE FOR THE CONTACTLESS TRANSMISSION OF DATA TO MOBILE DATA CARRIERS WITH SYSTEM FOR PREVENTING TOO CLOSE AN APPROACH

This is a Continuation of International Application PCT/DE96/001629, with an international filing date of Sep. 2, 1996, the disclosure of which is incorporated into this application by reference.

FIELD OF AND BACKGROUND OF THE INVENTION

The invention relates to new and useful improvements in wireless data transmission systems. More particularly, the invention relates to systems for transmitting data between a stationary unit and mobile data carriers.

In the field of identification technology, data are often transmitted inductively, without contact, between a read-write unit, which is usually fixed, and mobile data memories. The read-write unit builds up a radio-frequency electromagnetic field for this purpose. It uses this on the one hand to transmit data to or receive data from the mobile data carrier. On the other hand, the field also transmits a great deal of electrical energy inductively to a mobile data carrier, in order to put it into a state in which it is ready to transmit or receive. A separate power supply for the data carrier, for example a battery, then becomes unnecessary.

This sort of transmission of data and energy requires at least that the mobile data memory be brought into the transmitting and receiving region of the read-write unit, i.e., into the unit's radio-frequency induction field.

Problems can arise if a person has to handle the mobile data memory in the form of an identity card, or if it is fastened to his/her clothing. Such applications occur, for example, in the case of mobile data memories which are used to permit automatic contactless access of people to public transport, leisure facilities, employment premises, etc. Specifically, the persons handling such cards may include individuals with medical implants, such as a pacemaker, or with insulin pumps or the like. It cannot be entirely ruled out that radio-frequency alternating electromagnetic fields emitted by contactless identification devices of the above type may cause undesired impairment of the operation of the implanted appliance, should an implantee approach too close to a read-write unit.

OBJECTS OF THE INVENTION

It is therefore an object of the invention to provide a device for contactless transmission of data and/or energy to and/or from mobile data carriers, that is capable of preventing implants from approaching the device in a manner that could be damaging or dangerous.

SUMMARY OF THE INVENTION

These and other objects are achieved by the teaching of the independent claims. Particularly advantageous refinements of the invention are the subject matter of the dependent claims.

According to one formulation, the invention provides a device for contactless transmission of at least data via an electromagnetic field. This device includes an antenna for transmitting the data at least uni-directionally between the device and a mobile data carrier. An antenna field area is provided for covering the antenna. At least one spacer, which is located on at least an edge region of the antenna field area, is configured to prevent areas of a human trunk from approaching too close to the antenna field area.

BRIEF DESCRIPTION OF THE DRAWINGS

The invention and further advantageous refinements of the invention according to the features of the dependent claims are explained in more detail below with the aid of diagrammatic, exemplary embodiments in the drawing, in which:

DETAILED DESCRIPTION OF THE PREFERRED EMBODIMENTS

Figure 1:
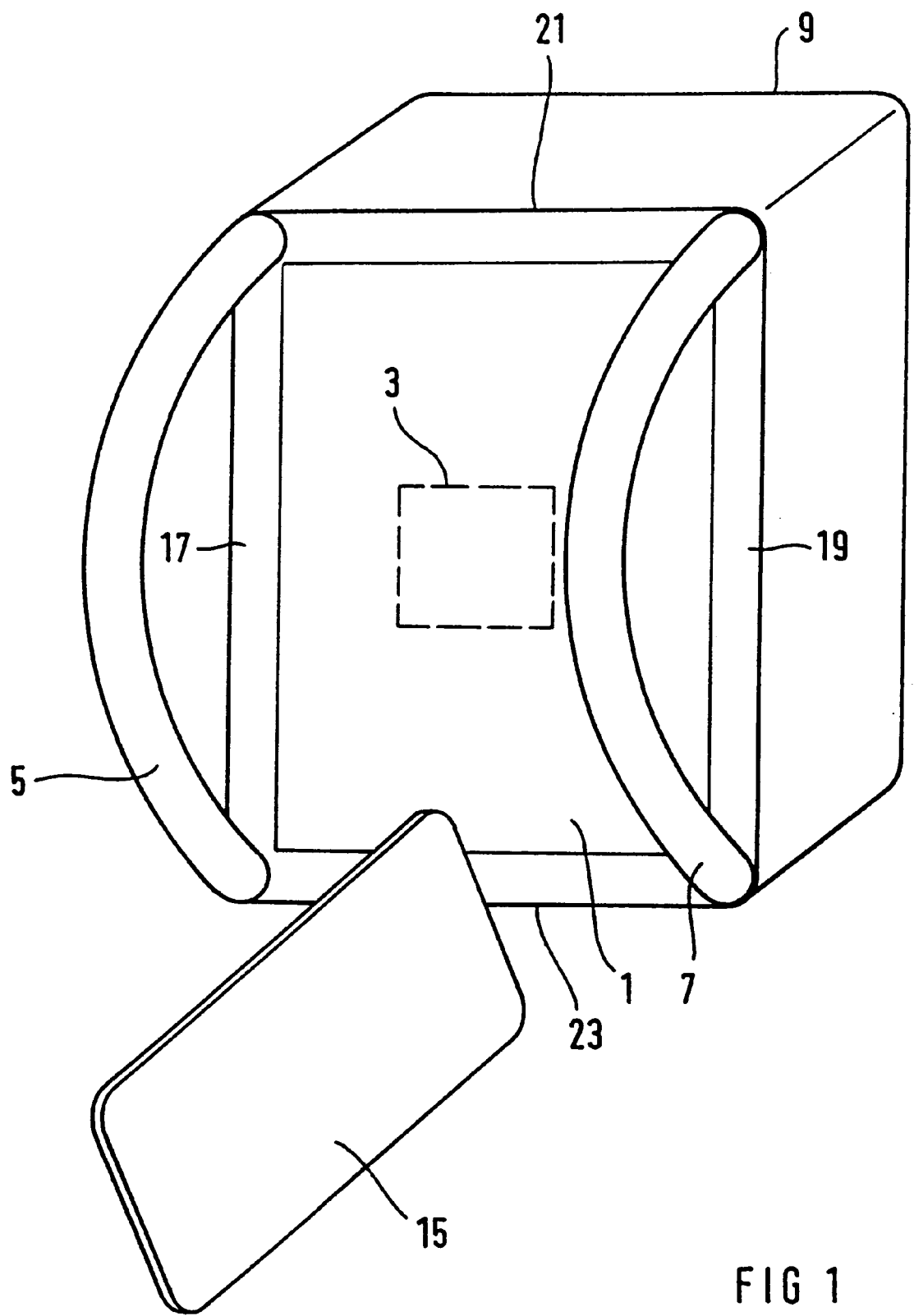
FIG. 1 shows a first embodiment of a device configured according to the invention in the form of a housing with bow-shaped members.

The device shown in FIG. 1 provides contactless transmission of data and/or energy to and/or from a mobile data carrier 15 via an electromagnetic field. By way of example, the data carrier can take the form of a chip card which, for the purpose of enabling transmission of data and energy, has to be brought near the transmitting device. In the example of FIG. 1, the device is accommodated in a separate housing 9. An antenna 3 for emitting data to and/or receiving data from the data carrier 15 is preferably located in a region on the front side of the housing. An antenna field area 1 serves to cover at least the antenna 3, which is preferably laminated in sealing compound and fitted to the rear side of the antenna field area 1. For this reason it is represented in FIG. 1 by a dashed line. The device has distancing means in the form of spacers 5, 7, which are located on at -least one edge region 17 and/or 19 of the antenna field area 1 and are designed to prevent, in particular, areas of the human chest, back and pelvis from approaching too close to the antenna field area 1.

The clear width of the antenna field area 1 is designed such that a person can use his hand to bring a mobile data carrier 15 into the direct vicinity of the antenna field area 1, i.e. into the region between the spacers 5, 7. In the example of FIG. 1, the spacers 5, 7 are mounted as a pair and opposite one another. On the other hand, the spacers are arranged on one or more edge regions around the antenna field area so as to specifically prevent the larger parts of a human body, for example the chest, back and pelvis areas, from inadvertently and unintentionally coming into direct contact with the antenna field area, which could cause devices implanted into the body to malfunction.

A housing-like read-write device, for example as shown in FIG. 1, may be fitted in an easily accessible location for payment purposes in busy areas, for example inside buses and trains, where a person might bump against the antenna field area because of vibrations or crowds. If so, the spacers must prevent an impermissibly close approach of sensitive parts of the body to the antenna field area.

In the embodiment of FIG. 1, the spacers are configured in the form of two bows 5, 7, which are arranged on two opposite vertical side edges 17, 19 of the antenna field area 1. In this embodiment, the side edges 17, 19 equate with the vertical edges of the housing, although this need not be the case. If required, it is also possible to arrange additional spacing bows on the two opposite horizontal side edges 21, 23 of the antenna field area, which here coincide with the transverse edges of the housing.

Figure 2:
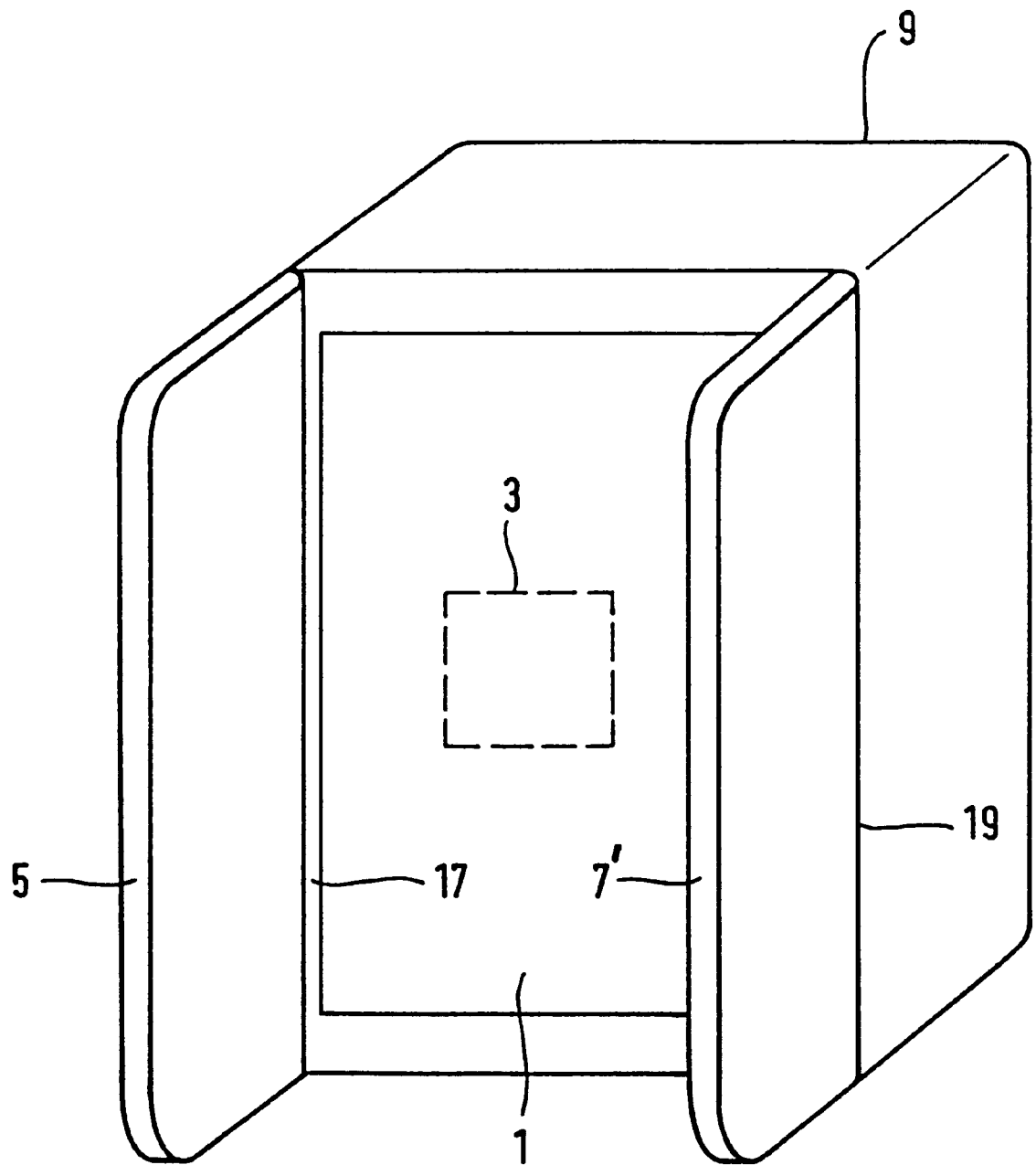
FIG. 2 shows a second embodiment of a device configured according to the invention in the form of a housing with longitudinally wedge-shaped or screen-like spacers.

According to another design, the spacers can also be configured in the form of at least one longitudinal wedge or screen. In FIG. 2, the spacers are in the form of side walls 5', 7' on two opposite sides 17, 19 of the antenna field area 1.

Figure 3:
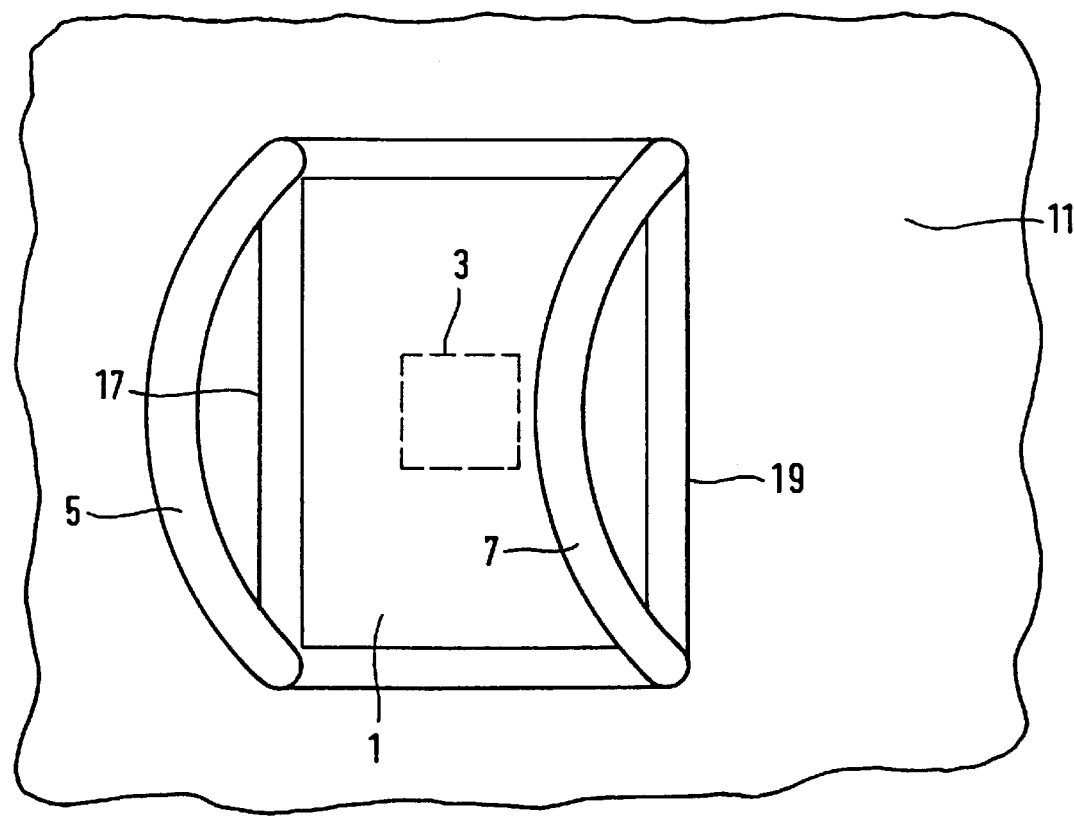
FIG. 3 shows a third embodiment of a device configured according to the invention in the form of a device form fitted in a surrounding holding surface, again with bow-shaped members.

In FIG. 3, the antenna field area 1 with the antenna 3 situated behind it is flush-fitted in a surrounding holding surface 11. This can be, e.g., an inner or outer wall of a room or building. The antenna field area 1 is then preferably fitted in at the holding surface approximately at hip or chest height for a person of average height. The spacers are again bow-shaped in the embodiment of FIG. 3.

Figure 4:
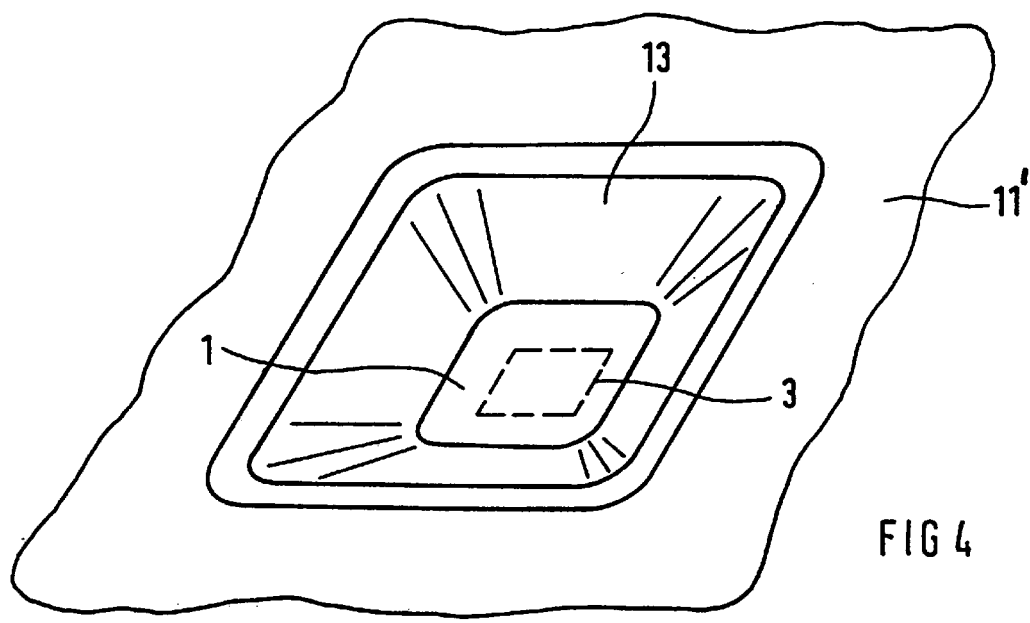
FIG. 4 shows a fourth embodiment of a device configured according to the invention in the form of a device recessed into a surrounding holding surface, with a well-shaped recess functioning as the distancing means.

FIG. 4 shows an embodiment in which the spacers are configured in the form of a recess, specifically a well 13, holding the antenna field area 1. The well floor is formed by the antenna field area 1. The well can be shaped as desired, e.g., bowl-shaped or oval, and is fitted in a surrounding holding surface 11' or some part thereof.

Figure 5:
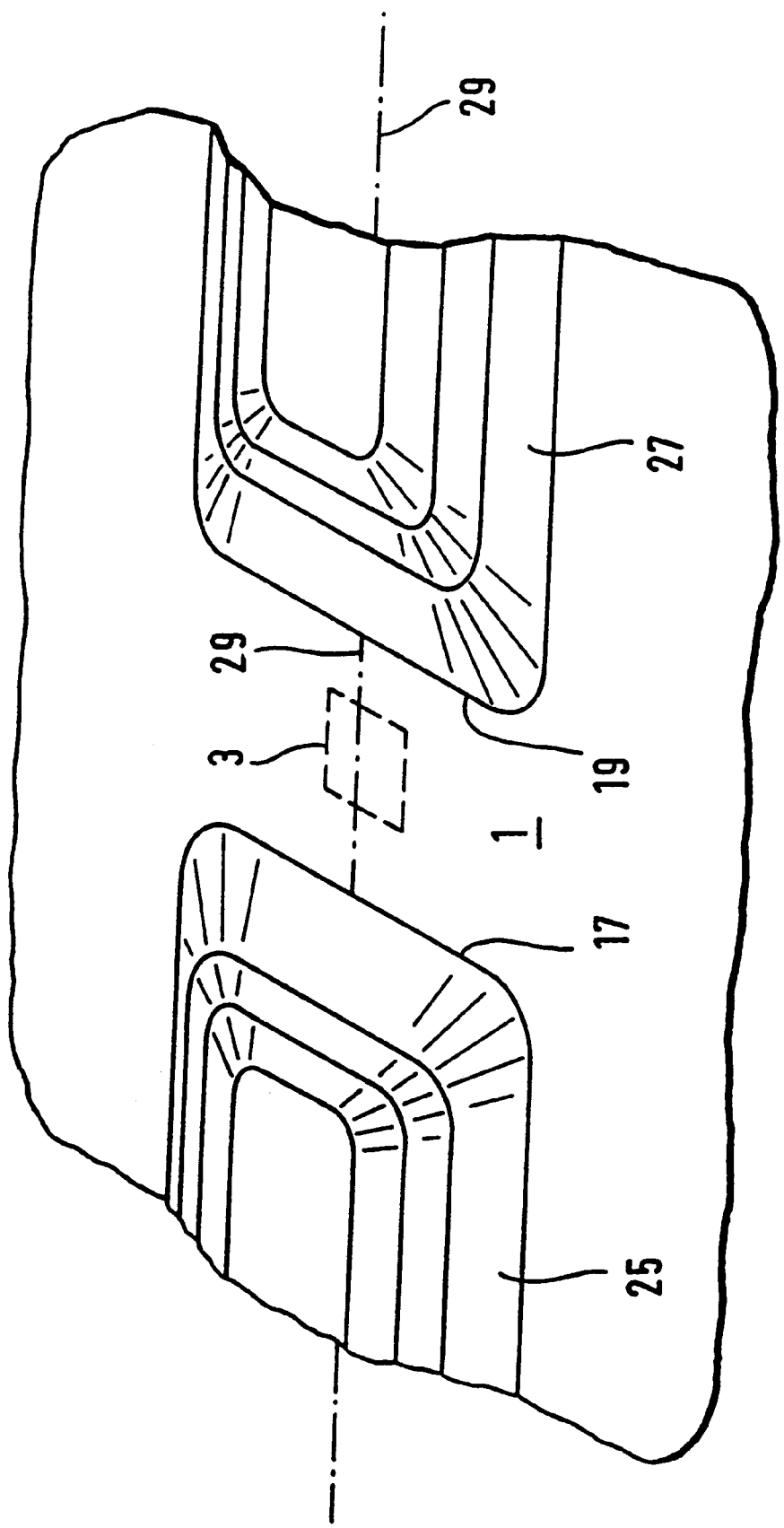
FIG. 5 shows a fifth embodiment of a device configured according to the invention with spacers in the form of elevations (two shown here by way of example).

In a further exemplary embodiment, represented in FIG. 5, the distancing means are configured in the form of at least one elevation on at least one edge region of the antenna field area 1. The elevation can be in the form of a hump or ridge. The elevation can also be a component of a cover or control panel of a neighboring appliance, or can be connected to or integrated into the appliance. In the specific embodiment shown, the spacers are advantageously configured in the form of two elevations 25, 27 located on opposite edge regions 17, 19 of the antenna field area 1 along a horizontal line of alignment or symmetry 29.

The above description of the preferred embodiments has been given by way of example. From the disclosure given, those skilled in the art will not only understand the present invention and its attendant advantages, but will also find apparent various changes and modifications to the structures disclosed. For example, the various types of distancing means described are not exclusive of one another, but rather can be combined with one another. According to one such embodiment, the device includes both a recessed antenna field area and bow-shaped members extending out from the device. It is sought, therefore, to cover all such changes and modifications as fall within the spirit and scope of the invention, as defined by the appended claims, and equivalents thereof.

What is claimed is:

1. A device for contactless transmission of at least data via an electromagnetic field, comprising:
 a) an antenna for transmitting the data at least unidirectionally between the device and a mobile data carrier, said antenna having a first surface area,
 b) an antenna field area covering said antenna and extending beyond said antenna to cover a second surface area that is not dimensioned in accordance with any dimension of the mobile data carrier, said antenna field area being bounded by edge regions and defining an open air space extending outward from said antenna field area, and
 c) at least one spacer, which is located on at least one of the edge regions of said antenna field area and is configured to prevent areas of a human trunk from approaching said antenna field area within an effective vicinity of the electromagnetic field.

2. The device as claimed in claim 1, wherein said antenna is configured to emit data to the mobile data carrier.

3. The device as claimed in claim 1, wherein said antenna is configured to receive data from the mobile data carrier.

4. The device as claimed in claim 1, wherein said antenna is configured to transmit energy to the mobile data carrier.

5. The device as claimed in claim 1, further comprising a second spacer located on another one of the edge regions opposite the one edge region on which the one spacer is located, such that said antenna is disposed substantially equidistant between the one edge region and the other edge region.

6. The device as claimed in claim 1, wherein said spacer is configured as a bow.

7. The device as claimed in claim 1, wherein said spacer is configured as a longitudinal screen.

8. The device as claimed in claim 1, wherein said spacer is configured as a longitudinal wedge.

9. The device as claimed in claim 1, wherein two of said spacers are arranged respectively on at least two opposite edge regions of said antenna field area.

10. The device as claimed in claim 1, wherein the total surface area of said antenna field area is at least nine times as large as the surface area of said antenna.

11. The device as claimed in claim 1, wherein said spacer is configured as a well into which said antenna field area is recessed.

12. The device as claimed in claim 1, wherein said spacer is configured as an elevation extending up from a surface of the one edge region of said antenna field area.

13. The device as claimed in claim 12, wherein two of said spacers, each configured as an elevation, are arranged respectively on opposite edge regions of the antenna field area along a line of symmetry.

14. The device as claimed in claim 1, wherein the second surface area is at least nine times as large as the first surface area.

15. The device as claimed in claim 1, wherein the second surface area is at least four times as large as the first surface area.

16. A system for communicating data, comprising:
 a mobile data memory; and
 a stationary unit comprising:
  (a) an antenna configured for at least one of (a1) transmitting data to said memory inductively over a predetermined, limited range, and (a2) receiving data from said memory inductively over a predetermined, limited range; and
  (b) distancing means defining a gap and straddling said antenna;
 wherein:
  said antenna is recessed within or behind the gap;
  the gap extends in a plane beyond said antenna to cover a surface area that is not dimensioned in accordance with any dimension of said mobile data memory;
 said distancing means project, relative to said antenna, by a projection distance that is at least substantially equal to the predetermined, limited range; and
 the gap defines a space open for receiving said mobile data memory in any orientation yet insufficient for receiving a torso of an adult human body.

17. The system according to claim 16, wherein said memory is a hand-held, substantially rectangular card.

18. The system according to claim 16, wherein said memory is a chip card.

19. The system according to claim 16, wherein said stationary unit further comprises:

(c) a sealing layer covering said antenna; and wherein said sealing layer is recessed within or behind the gap.

20. The system according to claim 16, wherein said distancing means project from said stationary unit.

21. The system according to claim 16, wherein the gap defines a space sufficient for receiving at least a portion of an adult human hand yet insufficient for receiving a torso of a human adolescent.

22. The device as claimed in claim 16, wherein the surface area of the gap is at least four times as large as the surface area of said antenna.

23. The device as claimed in claim 16, wherein the surface area of the gap is at least nine times as large as the surface area of said antenna.

24. A device for wireless transmission of data, comprising:

a) an antenna for transmitting the data at least unidirectionally between the device and a mobile data carrier, b) an antenna field area bounded by edge regions and covering the antenna, wherein said antenna field area has a total surface area that is dimensioned without adaptation to any dimension of the mobile data carrier, and c) at least two spacers projecting from the edge regions and projecting, relative to said antenna field area, by a given distance, wherein said spacers define, together with said antenna field area, a three dimensional, uninterrupted air space, and wherein said spacers are configured to prevent an adult human torso from approaching said antenna field area substantially closer than the given distance.

25. The device according to claim 24, wherein said spacers are configured to prevent a torso of a human adolescent from approaching said antenna field area substantially closer than the given distance.

26. The device as claimed in claim 24, wherein the total surface area of said antenna field area is at least four times as large as the surface area of said antenna.

* * * * *